United States Patent
Wanami et al.

(10) Patent No.: US 7,289,894 B2
(45) Date of Patent: Oct. 30, 2007

(54) OCCUPANT SENSING SYSTEM AND ADJUSTMENT METHOD THEREOF

(75) Inventors: Shingo Wanami, Kariya (JP); Satoshi Goshima, Tokyo (JP); Hideyuki Karasawa, Tokyo (JP)

(73) Assignees: Denso Corporation, Kariya (JP); Fuji Jukogyo Kabushiki Kaisya, Tokyo (JP)

( * ) Notice: Subject to any disclaimer, the term of this patent is extended or adjusted under 35 U.S.C. 154(b) by 438 days.

(21) Appl. No.: 11/054,614

(22) Filed: Feb. 10, 2005

(65) Prior Publication Data

US 2005/0187736 A1 Aug. 25, 2005

(30) Foreign Application Priority Data

Feb. 13, 2004 (JP) .............................. 2004-036969
Sep. 28, 2004 (JP) .............................. 2004-282402

(51) Int. Cl.
*B60R 22/00* (2006.01)
(52) U.S. Cl. .................... 701/45; 180/273; 702/101
(58) Field of Classification Search ................ 701/37, 701/39, 45, 47; 702/101; 177/144; 73/1.13; 180/273; 280/735
See application file for complete search history.

(56) References Cited

U.S. PATENT DOCUMENTS

| | | | | |
|---|---|---|---|---|
| 6,039,344 A | * | 3/2000 | Mehney et al. | 280/735 |
| 6,759,604 B2 | | 7/2004 | Ishida et al. | |
| 7,032,700 B2 | * | 4/2006 | Sakai et al. | 180/273 |
| 7,178,411 B2 | * | 2/2007 | Wanami et al. | 73/862.041 |
| 2004/0075568 A1 | | 4/2004 | Tanabe | |

* cited by examiner

*Primary Examiner*—Richard M. Camby
(74) *Attorney, Agent, or Firm*—Posz Law Group, PLC

(57) ABSTRACT

An occupant sensing ECU determines an occupant state on a seat by comparing occupant determination threshold values with a corresponding sensed load data value, which is originated from load sensors. The ECU stores an adjustment value, which is used to adjust a predetermined design value of each of the occupant determination threshold values. The adjustment value is a difference between an empty-state 0 point load value and a predetermined design value of the empty-state 0 point load value.

10 Claims, 3 Drawing Sheets

OCCUPANT SENSING SYSTEM AND ADJUSTMENT METHOD THEREOF

CROSS REFERENCE TO RELATED APPLICATION

This application is based on and incorporates herein by reference Japanese Patent Application No. 2004-36969 filed on Feb. 13, 2004 and Japanese Patent Application No. 2004-282402 filed on Sep. 28, 2004.

BACKGROUND OF THE INVENTION

1. Field of the Invention

The present invention relates to an occupant sensing system, which senses an occupant state on a seat and transmits the sensed result to an occupant protective apparatus (e.g., an air bag apparatus or a seat belt pretensioner), and also relates to an adjustment method thereof.

2. Description of Related Art

An occupant sensing system is used to determine an occupant state on a seat of a vehicle (see, for example, Japanese Unexamined Patent publication No. 2003-14528, which corresponds to U.S. Pat. No. 6,759,604). The occupant sensing system includes load sensors and an occupant sensing electronic control unit (ECU). The occupant sensing ECU stores an empty-state 0 (zero) point load value and one or more occupant determination threshold values. The empty-state 0 point load value indicates the load on the empty seat, on which no occupant is present. Each occupant determination threshold value is a threshold value, which is used to determine a type of an occupant on the seat. There is provided at least one occupant determination threshold value depending on the type(s) of occupant(s) or occupant state(s) to be determined.

For example, when three types of occupant states, i.e., an empty, a child and an adult need to be determined, there are provided two threshold values, i.e., an empty/child occupant determination threshold value and a child/adult occupant determination threshold value. In the case where the seat is empty, it is possible to determine whether the seat is empty by comparing the sensed data value of the load sensors with the empty/child occupant determination threshold value. When it is determined that the seat is empty, deployment of an air bag apparatus provided to the seat is prohibited or is disabled. In contrast, when it is determined that the seat is not empty, it is then determined whether the occupant on the seat is a child or an adult by comparing the sensed data value of the load sensors with the child/adult occupant determination threshold value. When it is determined that the occupant on the seat is the child, the deployment of the air bag apparatus provided to the seat is prohibited. However, when it is determined the occupant on the seat is the adult, the deployment of the air bag apparatus is enabled. As described above, the occupant determination threshold values are used to determine whether the occupant protective apparatus should be actuated.

However, the empty-state 0 point load value could vary from one seat to another seat due to, for example, a difference in a type of the seat, a difference in the amount of distortion encountered at the time of installing the load sensors to the seat or at the time of installing the seat having the load sensors to a vehicle body. Thus, adjustment of the occupant determination threshold values needs to be performed after the installation to improve the accuracy of the occupant determination performance.

However, in the previously proposed case, the occupant determination threshold values are adjusted by actually placing an intermediate reference weight, which is intermediate between a weight of the child and a weight of the adult, on the seat. Thus, depending on the way of placing the intermediate reference weight on the seat (e.g., depending on vibrations of the seat at the time of placing the intermediate reference weight on the seat) or an error in the intermediate reference weight, the applied load to the load sensors may be varied to decrease the occupant determination accuracy. Furthermore, when variations in the sensed data values of the load sensors need to be reduced to address the above disadvantage, the costs of the occupant sensing system are disadvantageously increased.

SUMMARY OF THE INVENTION

The present invention addresses the above disadvantages. Thus, it is an objective of the present invention to provide an occupant sensing system, which allows adjustment of an occupant determination threshold value without requiring placement of a reference weight on a seat while achieving a relatively high accuracy for occupant determination. It is another objective of the present invention to provide an adjustment method of such an occupant sensing system.

To achieve the objectives of the present invention, there is provided an occupant sensing system, which includes a plurality of load sensors and an occupant sensing ECU. Each of the plurality of load sensors senses a load applied to a seat of a vehicle. The occupant sensing ECU determines an occupant state on the seat by comparing a corresponding one of at least one sensed load data value with at least one occupant determination threshold value. Each of the at least sensed load data value is originated from corresponding one or more of the plurality of load sensors. The at least one occupant determination threshold value is for determining a type of an occupant on the seat. The occupant sensing ECU stores at least one adjustment value, each of which is used to adjust a predetermined design value of each of the at least one occupant determination threshold value to obtain the at least one occupant determination threshold value. Each of the at least one adjustment value is a difference between a corresponding one of at least one empty-state 0 point load value and a predetermined design value of the corresponding one of the at least one empty-state 0 point load value. Each of the at least one empty-state 0 point load value indicates a load applied to the seat in an empty state of the seat and is sensed through the corresponding one or more of the plurality of load sensors.

To achieve the objectives of the present invention, there is provided a method for adjusting an occupant sensing system, which includes a plurality of load sensors and an occupant sensing ECU. Each of the plurality of load sensors senses a load applied to a seat of a vehicle. The occupant sensing ECU determines an occupant state on the seat by comparing a corresponding one of at least one sensed load data value with at least one occupant determination threshold value. Each of the at least sensed load data value is originated from corresponding one or more of the plurality of load sensors. The at least one occupant determination threshold value is for determining a type of an occupant on the seat. According to the method, a load applied to the seat in an unloaded empty state of the seat is sensed through the plurality of load sensors after installation of the seat, which has the plurality of load sensors, to a vehicle body. At least one adjustment value is written in the occupant sensing ECU. Each of the at least one adjustment value is a difference between a corresponding one of at least one empty-state 0 point load value and a predetermined design value of the corresponding one of the at least one empty-state 0 point load value. Each of the at least one empty-state 0 point load value indicates a load applied to the seat in the empty state of the seat and is sensed through corresponding one or more of the plurality of load sensors. The at least one occupant determination threshold value is adjusted based on the at least one adjustment value.

To achieve the objectives of the present invention, there is also provided a method for adjusting an occupant sensing system, which includes a plurality of load sensors and an occupant sensing ECU. Each of the plurality of load sensors senses a load applied to a seat of a vehicle. The occupant sensing ECU includes at least one memory and determines an occupant state on the seat by comparing a corresponding one of at least one sensed load data value with at least one occupant determination threshold value. Each of the at least sensed load data value is originated from corresponding one or more of the at least one load sensor. The at least one occupant determination threshold value is for determining a type of an occupant on the seat. According to the method, at least one adjustment value is computed based on a corresponding one of at least one sensed load data value, each of which is obtained from corresponding one or more of the at least one load sensor in an empty state of the seat. At least one occupant determination threshold value is computed by adding a corresponding one of the at least one adjustment value to a predetermined design value of each of the at least one occupant determination threshold value previously stored in a corresponding one of the at least one memory.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of an occupant sensing system will be described with reference to the accompanying drawings.

FIRST EMBODIMENT

Figure 1:
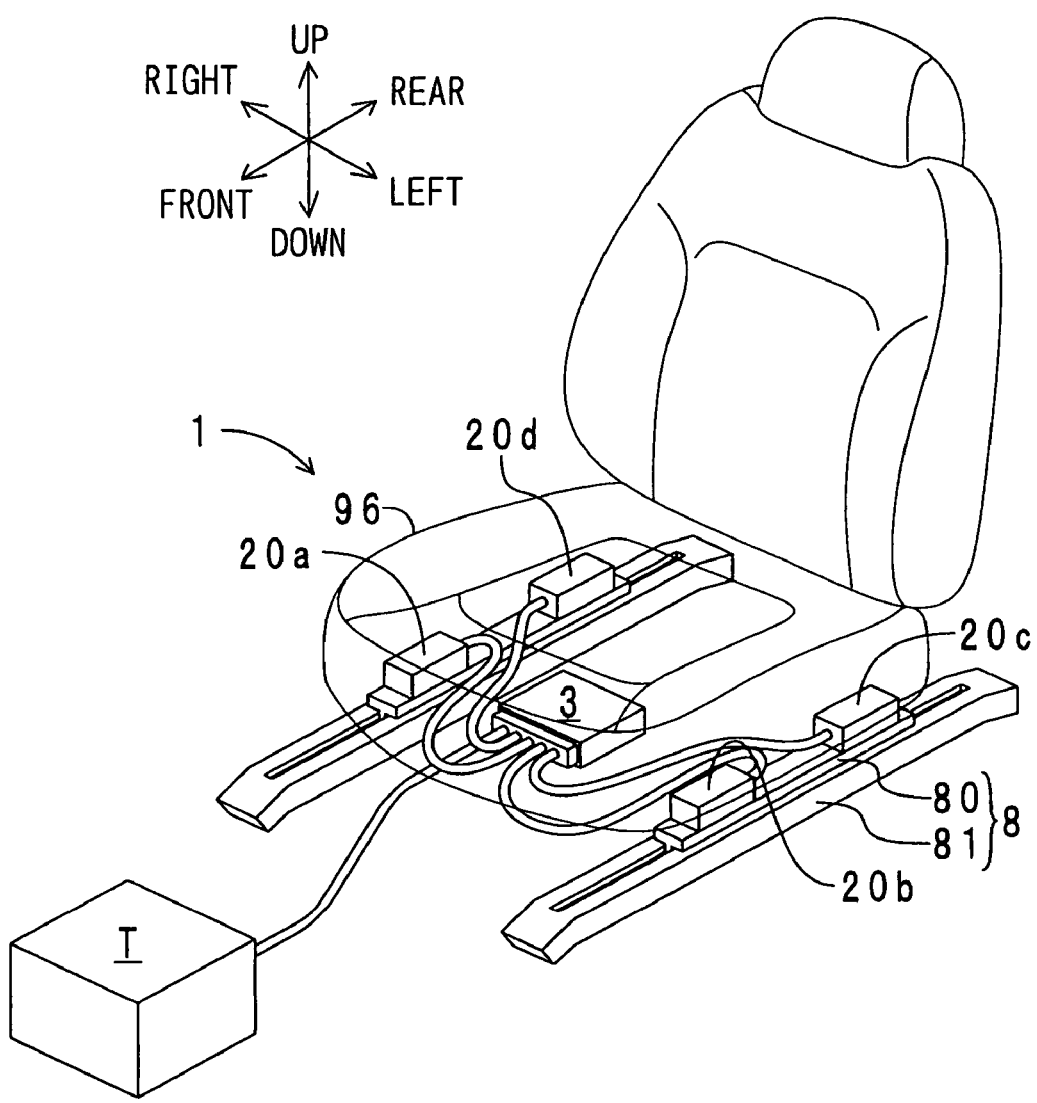
FIG. 1 is a perspective view of a seat, to which an occupant sensing system according to a first embodiment of the present invention is provided.
Figure 2:
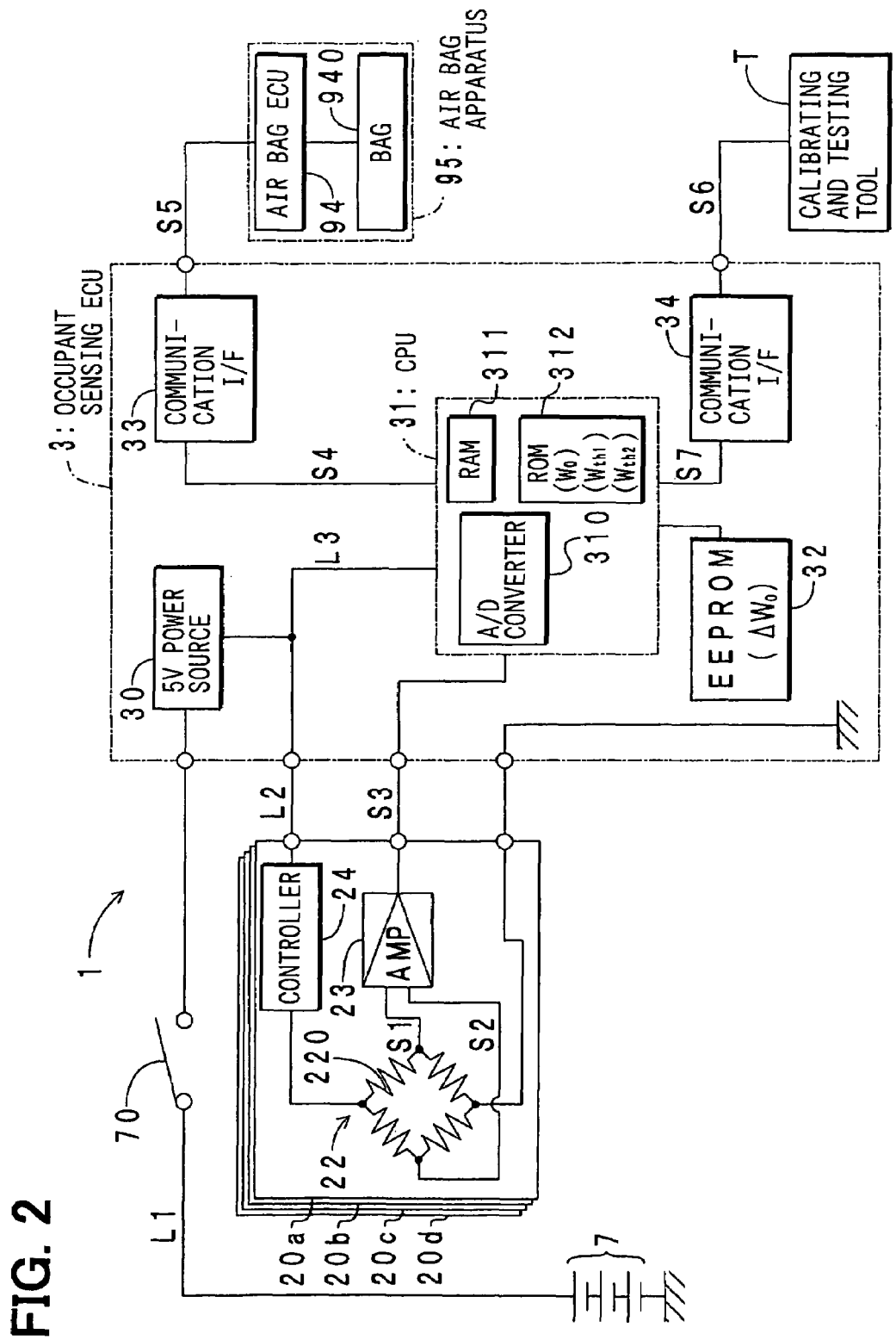
FIG. 2 is a block diagram showing the occupant sensing system.
Figure 3:
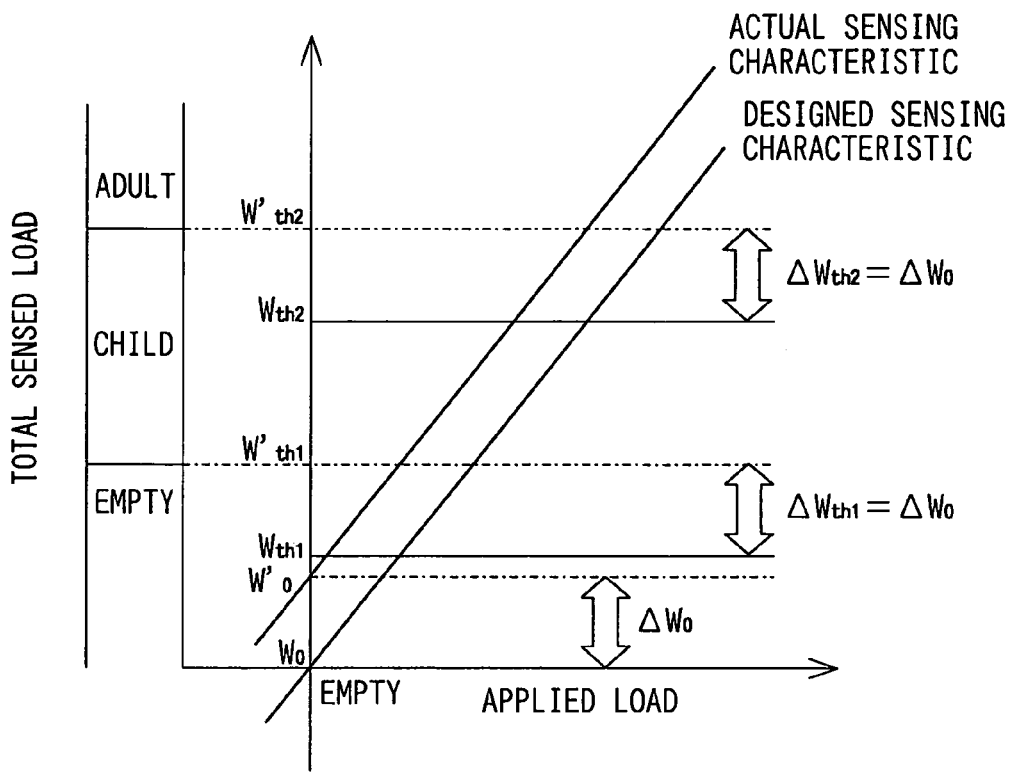
FIG. 3 is a graph showing a relationship between an applied actual load and a total sensed load of load sensors of the occupant sensing system in an adjustment operation of the occupant sensing system.

An occupant sensing system according to a first embodiment of the present invention will be described with reference to FIGS. 1 to 3. With reference to FIG. 1, in the occupant sensing system 1, two seat rail parts 8 are arranged parallel to each other in a transverse direction (a width direction) of a vehicle. Each seat rail part 8 includes an upper rail 80 and a lower rail 81. The lower rail 81 is secured to a floor (not shown) of a vehicle body. The upper rail 80 is slidable relative to the lower rail 81 in a fore-and-aft direction (or a longitudinal direction) of the vehicle. A seat (a front passenger seat) 96 is slidable integrally with the upper rails 80 in the fore-and-aft direction. Load sensors 20a-20d are placed in a space between a seat frame (not shown) of the seat 96 and the upper rails 80. The load sensor 20a is vertically opposed to a right front part of a seating surface of the seat 96. In the present embodiment, it should be understood that the left and right are defined with respect to a traveling direction (a running direction) of the vehicle. The load sensor 20b is vertically opposed to a left front part of the seating surface of the seat 96. The load sensor 20c is vertically opposed to a left rear part of the seating surface of the seat 96. The load sensor 20d is vertically opposed to a right rear part of the seating surface of the seat 96.

An occupant sensing ECU 3 is arranged on a back side of the seat 96. Each of the load sensors 20a-20d is connected to the occupant sensing ECU 3 through a corresponding wire harness. The load sensors 20a-20d and the occupant sensing ECU 3 constitute the occupant sensing system 1 of the present embodiment. In an adjusting operation of the occupant sensing system 1, a calibrating and testing tool (an external calibrating and testing device) T is connected to the occupant sensing ECU 3. The calibrating and testing tool (or simply referred to as the calibrating tool) T will be described in greater detail below.

Next, a detailed structure of the occupant sensing system 1 of the present embodiment will be described. As schematically shown in FIG. 2, the load sensor 20a includes a gauge section 22, an amplifier 23 and a controller 24. The gauge section 22 includes four strain gauges 220, which form a bridge circuit. The amplifier 23 amplifies voltage data value (voltage signal) outputted from the gauge section 22. The controller 24 adjusts a slope and an intercept of the voltage data value. Upon the adjustment, the amplifier 23 can achieve desired linear output characteristics. Each of the other load sensors 20b-20d has a structure, which is similar to that of the load sensor 20a. Therefore, description of the structure of each of the other load sensors 20b-20d will be eliminated for the sake of simplicity.

The occupant sensing ECU 3 includes a 5V power source 30, a central processing unit (CPU) 31, an EEPROM 32, an air bag apparatus communication interface (I/F) 33 and a calibrating and testing tool communication interface (I/F) 34. The EEPROM 32 serves as a rewritable nonvolatile memory of the present invention. The 5V power source 30, which provides the electric power of 5 volts, is connected to a vehicle battery 7 through an ignition switch 70. The CPU 31 includes an A/D converter 310, a RAM 311 and a ROM 312. The ROM 312 serves as a read-only memory of the present invention. The A/D converter 310 converts the analog voltage data value, which is supplied from the amplifier 23, into a corresponding digital voltage data value. The RAM 311 temporarily stores the converted digital data value. A program (not shown) for performing an occupant sensing operation is previously stored in the ROM 312. The RAM 311 also stores a predetermined design value $W_0$ of an empty-state 0 point load value, a predetermined design value $W_{th1}$ of an empty/child occupant determination threshold value and a predetermined design value $W_{th2}$ of a child/adult occupant determination threshold value. The EEPROM 32 stores, for example, malfunction information of the load sensors 20a-20d at the time of occurrence of malfunctioning of the load sensors 20a-20d. The EEPROM 32 also stores an adjustment value $\Delta W_0$ at the time of performing the adjusting operation. The EEPROM 32 is capable of electrically erasing and rewriting its memory. The air bag apparatus communication I/F 33 transmits a result of the occupant determination operation of the CPU 31 to an air bag ECU 94 of an air bag apparatus 95. The calibrating and testing tool communication I/F 34 connects between the CPU 31 and the calibrating and testing tool T. The calibrating and testing tool communication I/F 34 is an interface circuit, which can perform two-way serial communication between the CPU 31 and the calibrating and testing tool T.

The calibrating and testing tool T is provided separately from the occupant sensing system 1. The calibrating and testing tool T is connected to the occupant sensing ECU 3 to adjust the empty-state 0 point load value and the occupant determination threshold values. The calibrating and testing tool T includes a manipulation arrangement and a display arrangement. The manipulation arrangement of the calibrating and testing tool T includes a CPU, a ROM, a RAM and a keyboard (not shown). In the calibrating and testing tool T, when the CPU retrieves and executes an adjustment program, which is stored in the ROM, the adjustment value $\Delta W_0$, which is stored in the EEPROM 32, may be rewritten.

Next, a power supply system of the occupant sensing system of the present embodiment will be described. When the ignition switch 70 is turned on, the electric power of 12 volts is supplied from the vehicle battery 7 to the 5V power source 30 through a power supply line L1. The 5V power source 30 converts the 12 volt electric power to the 5 volt electric power. After the conversion, the 5 volt electric power is supplied from the 5V power source 30 to the load sensors 20a-20d through a power supply line L2. Also, the 5 volt electric power is supplied from the 5V power source 30 to the CPU 31 through a power source line L3.

Next, a signaling system of the occupant sensing system of the present embodiment will be described. The load, which is applied to the seat 96, is sensed through the load sensors 20a-20d. As an exemplary case, the load sensor 20a will be described. A predetermined voltage is applied to the four strain gauges 220 of the gauge section 22. When the load is applied from the right front part of the seat 96 to the load sensor 20a, the resistances of the four strain gauges 220, which constitute the bridge circuit, change. Thus, the balance of the bridge circuit changes, and therefore a small voltage is generated in the gauge section 22. The voltage data value, which indicates the small voltage, is transmitted from the gauge section 22 to the amplifier 23 through signal lines S1, S2. The amplifier 23 amplifies the voltage data value, which is supplied from the gauge section 22. The amplified analog voltage data value is then transmitted to the A/D converter 310 of the CPU 31 through a signal line S3. The A/D converter 310 converts the analog voltage data value to the corresponding digital data value. The analog data value is also supplied from each of the other load sensors 20b-20d to the A/D converter 310 and is converted to the corresponding digital data value in the A/D converter 310. Each digital data value is temporarily stored in the RAM 311. The respective digital data value originated from each of the four sensors 20a-20d is retrieved from the RAM 311 and is summed through a summing operation in the CPU 31. The sum value (a sensed load data value) of the digital data values after the summing operation is compared with a corresponding one of the occupant determination threshold values to determine the state of the occupant in the CPU 31. Specifically, in the CPU 31, when the sum value is equal to or less than the empty/child occupant determination threshold value, it is determined that the seat 96 is empty. In contrast, when the sum value is greater than the empty/child occupant determination threshold value but is equal to or less than the child/adult occupant determination threshold value, it is determined that the occupant is a child. Furthermore, when the sum value is greater than the child/adult occupant determination threshold value, it is determined that the occupant is an adult.

The result of the determination is transmitted from the CPU 31 to the air bag ECU 94 through a signal line S4, the air bag communication I/F 33 and a signal line S5. The air bag ECU 94 outputs a command signal to the bag 940 based on the result of the determination. Specifically, in the case where the seat is empty or the occupant is the child, deployment of the bag 940 is prohibited, i.e., is disabled. In contrast, in the case where the occupant is the adult, deployment of the bag 940 is allowed, i.e., is enabled.

Next, the adjustment operation of the occupant sensing system of the present embodiment will be described. The adjustment operation is performed after the seat 96, to which the load sensors 20a-20d are assembled, is installed to the vehicle body. In the adjustment operation, the calibrating and testing tool T is connected to the calibrating and testing tool communication I/F 34 of the occupant sensing ECU 3. Next, an adjustment initiation command is transmitted from the calibrating and testing tool T to the CPU 31 through a signal line S6, the calibrating and testing tool communication I/F 34 and a signal line S7. When the CPU 31 receives the adjustment initiation command, the adjustment operation of the occupant sensing ECU 3 is allowed, i.e., is enabled.

Then, the seat 96 is placed in an empty state. Thereafter, the outputs of the load sensors 20a-20d are supplied to the calibrating and testing tool T through the signal line S7, the calibrating and testing tool communication I/F 34 and the signal line S6.

Next, the sum value of the loads measured by the load sensors 20a-20d, i.e., the sum value of the outputs of the load sensors 20a-20d (hereinafter, referred to as a total sensed load $W'_0$ of the seat empty state) is computed. As shown in FIG. 3, a difference (the adjustment value $\Delta W_0$) between the total sensed load $W'_0$ of the seat empty state and the design value $W_0$ stored in the ROM 312 is computed. Thereafter, when a write command is received from the calibrating and testing tool T, the adjustment value $\Delta W_0$ is written in, i.e., is stored in the EEPROM 32. At this stage, a permissible adjustment range, which is previously set and is stored in the ECU 3, is compared with the adjustment value $\Delta W_0$. After the comparison, when the adjustment value $\Delta W_0$ is within the permissible adjustment range, the writing operation, i.e., the storing operation of the adjustment value $\Delta W_0$ in the EEPROM 32 is performed. In contrast, when the adjustment value $\Delta W_0$ is below or above the permissible adjustment range, the writing operation, i.e., the storing operation of the adjustment value $\Delta W_0$ in the EEPROM 32 is prohibited. With reference to FIG. 3, it should be noted that the adjustment value $\Delta W_{th1}$ for the empty/child occupant determination threshold value and the adjustment value $\Delta W_{th2}$ for the child/adult occupant determination threshold value are set to be the same as the adjustment value $\Delta W_0$ for the empty-state 0 point load value in the present embodiment.

Next, the occupant determination operation of the occupant sensing ECU 3 is performed. The occupant determination operation is performed upon setting various load conditions of the seat 96. The result of the occupant determination operation of the occupant sensing ECU 3 is transmitted to the calibrating and testing tool T. An operator can check whether the result of the occupant determination operation of the occupant sensing ECU 3 is correct through the display arrangement of the calibrating and testing tool T. Furthermore, as shown in FIG. 3, in the occupant determination operation, a sum value of the design value $W_0$ of the empty-state 0 point load value stored in the ROM 312 and the adjustment value $\Delta W_0$ stored in the EEPROM 32 is used as the empty-state 0 point load value $W'_0$. Furthermore, a sum value of the design value $W_{th1}$ of the empty/child occupant determination threshold value stored in the ROM 312 and the adjustment value $\Delta W_0$ stored in the EEPROM 32 is used as the empty/child occupant determination threshold value (a first integral occupant determination threshold value) $W'_{th1}$. In addition, a sum value of the design value $W_{th2}$ of the child/adult occupant determination threshold value and the adjustment value $\Delta W_0$ stored in the EEPROM 32 is used as the child/adult occupant determination threshold value (a second integral occupant determination threshold value) $W'_{th2}$. The adjustment and testing operation of the occupant sensing system of the present embodiment is performed in the above described manner.

Next, advantages (or effects) of the present embodiment will be described. In the occupant sensing system 1 of the present embodiment, the adjustment value $\Delta W_0$ for the empty-state 0 point load value is used as the adjustment value of the occupant determination threshold value. Thus, the empty/child occupant determination threshold value $W'_{th1}$ and the child/adult occupant determination threshold value $W'_{th2}$ can be adjusted in the seat empty state without placing a weight on the seat 96. Furthermore, various factors, such as the way of placing the reference weight on the seat 96 and an error in the reference weight placed on the seat 96, will not have effects on the sensed data value of the load sensors 20a-20d, which are used to adjust the occupant determination threshold values. As a result, the occupant determination accuracy is improved.

Furthermore, in the occupant sensing system 1 of the present embodiment, as described above, the adjustment value $\Delta W_0$ is stored in the rewritable EEPROM 32. Thus, the adjustment value $\Delta W_0$ can be corrected at the time of, for example, vehicle inspection. Also, as described above, the design value $W_{th1}$ of the empty/child occupant determination threshold value and the design value $W_{th2}$ of the child/adult occupant determination threshold value are stored in the ROM 312. Thus, for example, even at the time of malfunctioning of the EEPROM 32, the required minimum occupant determination performance can be achieved through use of the empty/child occupant determination threshold value $W_{th1}$ and the child/adult occupant determination threshold value $W_{th2}$.

Furthermore, as described above, the permissible adjustment range is previously set in the occupant sensing ECU 3 of the occupant sensing system 1. When the inputted adjustment value $\Delta W_0$ is out of the permissible adjustment range, the writing operation, i.e., the storing operation of the adjustment value $\Delta W_0$ is prohibited. Therefore, according to the occupant sensing system of the present embodiment, it is possible to limit writing of the erroneous adjustment value $\Delta W_0$ in the occupant sensing ECU 3.

Furthermore, according to the adjustment method of the occupant sensing system 1 of the present embodiment, as described above, the empty/child occupant determination threshold value $W'_{th1}$ and the child/adult occupant determination threshold value $W'_{th2}$ can be adjusted in the seat empty state without placing the reference weight on the seat 96. Thus, the adjustment operation is eased. Furthermore, in comparison to the case where the empty/child occupant determination threshold value $W'_{th1}$ and the child/adult occupant determination threshold value $W'_{th2}$ are separately adjusted, the adjustment of the empty/child occupant determination threshold value $W'_{th1}$ and the adjustment of the child/adult occupant determination threshold value $W'_{th2}$ can be performed in the single operation in the present embodiment. In view of this point, the adjustment operation is further simplified.

SECOND EMBODIMENT

A second embodiment differs from the first embodiment in the following point. That is, the occupant sensing ECU has not only the adjustment value for the total sensed load of the four load sensors but also an adjustment value for the sensed load of each load sensor. Therefore, the following description will be focused only on this point.

Figure 4:
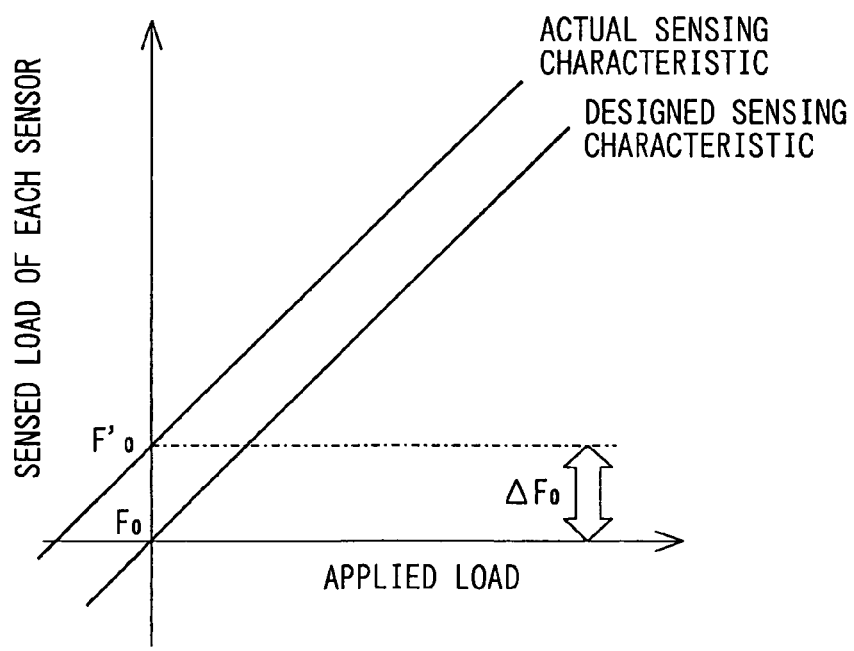
FIG. 4 is a graph showing a relationship between an applied actual load and a sensed load of each load sensor.

FIG. 4 shows a relationship between an applied actual load and a sensed load in any one of the four load sensors. As shown in FIG. 4, the EEPROM of the occupant sensing ECU of the present embodiment stores an adjustment value $\Delta F_0$ for each load sensor. Furthermore, the ROM stores a design value $F_0$ of the empty-state 0 point load value of each load sensor. The adjustment value $\Delta F_0$ is computed by obtaining a difference between the sensed load F'0 of each load sensor and the design value $F_0$ in the seat empty state and is stored in the EEPROM. Furthermore, the adjustment value $\Delta F_0$ is used not only for adjusting the empty-state 0 point load value but also for adjusting the occupant determination threshold values (first and second sensor-specific occupant determination threshold values).

According to the occupant sensing system of the present embodiment, it is relatively easy to construct a logic for determining the occupant state based on the total value of the sensed loads of the four load sensors and to construct a logic for determining the occupant state based on the value (a sensed load data value) of each of the four load sensors.

(Modifications)

The embodiments of the occupant sensing system and the adjustment method thereof are described above. However, the present invention is not limited to the above embodiments. Modifications of the above embodiments, which are conceivable by the person skilled in the art, can be made without departing the scope of the invention.

For example, in the above embodiments, the result of the occupant determination operation is used to drive the air bag apparatus 95. Alternatively, the result of the occupant determination operation can be used to drive any other occupant protective apparatus, such as a seat belt pretensioner.

Furthermore, the calibrating and testing tool communication I/F 34 can be provided to, for example, the air bag ECU 94 in place of the occupant sensing ECU 3. Also, the number of the load sensors 20a-20d is not limited to the above described one (i.e., four) and can be changed to any other appropriate number.

In the above embodiment, the empty/child occupant determination threshold value $W'_{th1}$ is obtained by summing up the design value $W_{th1}$ of the empty/child occupant determination threshold value stored in the ROM 312 and the adjustment value $\Delta W_0$ stored in the EEPROM 32. Also, the child/adult occupant determination threshold value $W'_{th2}$ is obtained by summing up the design value $W_{th2}$ of the child/adult occupant determination threshold value stored in the ROM 312 and the adjustment value $\Delta W_0$ stored in the EEPROM 32. Based on the computed empty/child occupant determination threshold value $W'_{th1}$ and the computed child/adult occupant determination threshold value $W'_{th2}$, the occupant determination is performed.

However, the empty/child occupant determination threshold value $W'_{th1}$ and the child/adult occupant determination threshold value $W'_{th2}$ can be stored in a memory, such as the EEPROM 32. Then, the occupant determination can be performed based on the empty/child occupant determination threshold value $W'_{th1}$ and the stored child/adult occupant determination threshold value $W'_{th2}$ upon retrieval of these values.

Additional advantages and modifications will readily occur to those skilled in the art. The invention in its broader terms is therefore not limited to the specific details, representative apparatus, and illustrative examples shown and described.

What is claimed is:

1. An occupant sensing system comprising:
   a plurality of load sensors, each of which senses a load applied to a seat of a vehicle; and
   an occupant sensing ECU that determines an occupant state on the seat by comparing a corresponding one of at least one sensed load data value with at least one occupant determination threshold value, wherein:
   each of the at least sensed load data value is originated from corresponding one or more of the plurality of load sensors;
   the at least one occupant determination threshold value is for determining a type of an occupant on the seat;
   the occupant sensing ECU stores at least one adjustment value, each of which is used to adjust a predetermined design value of each of the at least one occupant determination threshold value to obtain the at least one occupant determination threshold value;
   each of the at least one adjustment value is a difference between a corresponding one of at least one empty-state 0 point load value and a predetermined design value of the corresponding one of the at least one empty-state 0 point load value; and
   each of the at least one empty-state 0 point load value indicates a load applied to the seat in an empty state of the seat and is sensed through the corresponding one or more of the plurality of load sensors.

2. The occupant sensing system according to claim 1, wherein:
   the at least one occupant determination threshold value includes:
      at least one sensor-specific occupant determination threshold value, which is compared with the sensed load data value of each corresponding one of the plurality of load sensors; and
      at least one integral occupant determination threshold value, which is compared with a sum value of the sensed load data values of all of the plurality of load sensors; and
   the at least one adjustment value includes:
      a sensor-specific adjustment value, which is used to adjust the predetermined design value of each of the at least one sensor-specific occupant determination threshold value of each corresponding one of the plurality of load sensors; and
      an integral adjustment value, which is used to adjust the predetermined design value of each of the at least one integral occupant determination threshold value.

3. The occupant sensing system according to claim 1, wherein:
   the occupant sensing ECU includes a rewritable nonvolatile memory and a read-only memory;
   the rewritable nonvolatile memory stores the at least one adjustment value; and
   the read-only memory stores the predetermined design value of each empty-state 0 point load value and the predetermined design value of each occupant determination threshold value.

4. The occupant sensing system according to claim 1, wherein:
   the occupant sensing ECU stores a predetermined permissible adjustment range for the at least one adjustment value; and
   when the at least one adjustment value, which is supplied to the occupant sensing ECU, is out of the predetermined permissible adjustment range, the occupant sensing ECU prohibits writing of the at least one adjustment value in the occupant sensing ECU.

5. A method for adjusting an occupant sensing system, which includes:
   a plurality of load sensors, each of which senses a load applied to a seat of a vehicle; and
   an occupant sensing ECU that determines an occupant state on the seat by comparing a corresponding one of at least one sensed load data value with at least one occupant determination threshold value, wherein each of the at least sensed load data value is originated from corresponding one or more of the plurality of load sensors, and the at least one occupant determination threshold value is for determining a type of an occupant on the seat, the method comprising:
   sensing a load applied to the seat in an unloaded empty state of the seat through the plurality of load sensors after installation of the seat, which has the plurality of load sensors, to a vehicle body;
   writing at least one adjustment value in the occupant sensing ECU, wherein:
      each of the at least one adjustment value is a difference between a corresponding one of at least one empty-state 0 point load value and a predetermined design value of the corresponding one of the at least one empty-state 0 point load value; and
      each of the at least one empty-state 0 point load value indicates a load applied to the seat in the empty state of the seat and is sensed through corresponding one or more of the plurality of load sensors; and
   adjusting the at least one occupant determination threshold value based on the at least one adjustment value.

6. The adjustment method according to claim 5, wherein:
   the occupant sensing ECU includes a rewritable nonvolatile memory and a read-only memory;
   the rewritable nonvolatile memory stores the at least one adjustment value;
   the read-only memory stores the predetermined design value of each empty-state 0 point load value and the predetermined design value of each occupant determination threshold value; and
   the writing of the at least one adjustment value in the occupant sensing ECU includes writing the at least one adjustment value in the nonvolatile memory from an external device through an external communication with the external device.

7. The adjustment method according to claim 5, further comprising prohibiting the writing of the at least one adjustment value in the occupant sensing ECU when the at least one adjustment value is out of a predetermined permissible adjustment range stored in the occupant sensing ECU.

8. A method for adjusting an occupant sensing system, which includes:
   at least one load sensor, each of which senses a load applied to a seat of a vehicle; and an occupant sensing ECU that includes at least one memory and determines an occupant state on the seat by comparing a corresponding one of at least one sensed load data value with at least one occupant determination threshold value, wherein each of the at least sensed load data value is originated from corresponding one or more of the at least one load sensor, and the at least one occupant determination threshold value is for determining a type of an occupant on the seat, the method comprising:

computing at least one adjustment value based on a corresponding one of at least one sensed load data value, each of which is obtained from corresponding one or more of the at least one load sensor in an empty state of the seat; and computing at least one occupant determination threshold value by adding a corresponding one of the at least one adjustment value to a predetermined design value of each of the at least one occupant determination threshold value previously stored in a corresponding one of the at least one memory.

9. The adjustment method according to claim 8, wherein:

the computing of the at least one adjustment value includes:

computing at least one empty-state 0 point load value, each of which indicates a load applied to the seat in the empty state of the seat;

computing each of the at least one adjustment value as a difference between a corresponding one of the at least one empty-state 0 point load value and a predetermined design value of the corresponding one of the at least one empty-state 0 point load value stored in a corresponding one of the at least one memory; and storing the computed at least one adjustment value in a corresponding one of the at least one memory; and the determination of the occupant state on the seat is performed in the occupant sensing ECU by comparing the computed at least one occupant determination threshold value with the corresponding one of the at least one sensed load data value, each of which is obtained from the corresponding one or more of the at least one load sensor.

10. The adjustment method according to claim 8, further comprising storing the computed at least one occupant determination threshold value in a corresponding one of the at least one memory after the computing of the at least one occupant determination threshold value, wherein the determination of the occupant state on the seat is performed in the occupant sensing ECU by comparing the at least one occupant determination threshold value stored in the corresponding one of the at least one memory with the corresponding one of the at least one sensed load data value, each of which is obtained from the corresponding one or more of the at least one load sensor.

* * * * *